United States Patent
Arambepola et al.

(10) Patent No.: US 9,054,933 B2
(45) Date of Patent: Jun. 9, 2015

(54) ORTHOGONAL FREQUENCY DIVISION MULTIPLEX (OFDM) RECEIVER WITH PHASE NOISE MITIGATION AND REDUCED LATENCY

(75) Inventors: Bernard Arambepola, Enfield (GB); Thushara Hewavithana, Borehamwood (GB); Parveen K. Shukla, Nottingham (GB); Sahan S. Gamage, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,691

(22) PCT Filed: Dec. 20, 2011

(86) PCT No.: PCT/US2011/065978
§ 371 (c)(1),
(2), (4) Date: Apr. 11, 2014

(87) PCT Pub. No.: WO2013/095353
PCT Pub. Date: Jun. 27, 2013

(65) Prior Publication Data
US 2014/0211889 A1 Jul. 31, 2014

(51) Int. Cl.
*H04B 1/10* (2006.01)
*H04L 27/26* (2006.01)
*H04L 1/00* (2006.01)

(52) U.S. Cl.
CPC .......... *H04L 27/2649* (2013.01); *H04L 1/0036* (2013.01); *H04L 27/265* (2013.01); *H04L 27/2657* (2013.01); *H04L 27/2675* (2013.01)

(58) Field of Classification Search
CPC ............................... H04B 1/10; H04L 27/2657
USPC .......................................................... 375/355
See application file for complete search history.

(56) References Cited

U.S. PATENT DOCUMENTS

2004/0190637 A1 9/2004 Maltsev et al.
2004/0258171 A1 12/2004 Akita et al.
(Continued)

OTHER PUBLICATIONS

International Search Report and Written Opinion from related PCT/US2011/065978 mailed Jun. 27, 2012.
(Continued)

*Primary Examiner* — Tanmay Shah
(74) *Attorney, Agent, or Firm* — Grossman, Tucker, Perreault & Pfleger, PLLC (57) ABSTRACT

A system according to one embodiment includes a demodulator configured to receive an orthogonal frequency division multiplexed (OFDM) modulated signal comprising a current symbol and a sequence of previous symbols, each of the symbols comprising one or more pilot sub-carriers and one or more data sub-carriers; a phase angle computation circuit coupled to the demodulator, the phase angle computation circuit configured to compute a first mean, the first mean computed from the phase angle of one or more of the pilot sub-carriers of a predetermined number of the previous symbols; a predictive filter circuit coupled to the phase angle computation circuit, the predictive filter circuit configured to compute a second mean, the second mean estimating the phase angle of one or more sub-carriers of the current symbol, the estimation based on the first mean; and a phase noise cancelling circuit coupled to the predictive filter circuit, the phase noise cancelling circuit configured to correct the phase of one or more sub-carriers of the current symbol based on the second mean.

37 Claims, 5 Drawing Sheets

(56) References Cited

U.S. PATENT DOCUMENTS

| | | |
|---|---|---|
| 2006/0078070 A1* | 4/2006 | Zhidkov et al. ............... 375/326 |
| 2007/0086533 A1 | 4/2007 | Lindh |
| 2008/0123788 A1* | 5/2008 | Wongwirawat et al. ...... 375/348 |
| 2009/0073869 A1 | 3/2009 | Chadha et al. |
| 2009/0141836 A1 | 6/2009 | Shirakata et al. |
| 2011/0280351 A1 | 11/2011 | Yang et al. |

OTHER PUBLICATIONS

International Preliminary Report on Patentability from related PCT/US2011/065978 mailed Jun. 24, 2014.

* cited by examiner

ORTHOGONAL FREQUENCY DIVISION MULTIPLEX (OFDM) RECEIVER WITH PHASE NOISE MITIGATION AND REDUCED LATENCY

FIELD

The present disclosure relates to phase noise mitigation in an Orthogonal Frequency Division Multiplex (OFDM) receiver, and more particularly, to phase noise mitigation in an OFDM receiver with reduced latency.

BACKGROUND

Orthogonal Frequency Division Multiplex (OFDM) modulation techniques are often used to transmit signals between nodes in a network, such as a cable network or a wireless network. To achieve improved bit error rate performance in the OFDM demodulators at the receiving nodes, tuner phase noise is usually compensated for using a technique known as common phase error correction (CPE). CPE, however, introduces latency, which may exceed the specifications required by communications standards such as Multimedia over Coax (MoCA), Digital Video Broadcasting (DVB-C2), as well as standards associated with wireless personal area networks (WPAN), wireless local area networks (WLAN), Wireless Metropolitan Area Networks (WMAN), Wireless Wide Area Networks (WWAN) and the like.

Additionally, to achieve higher data rates, these standards use higher order OFDM sub-carrier quadrature amplitude modulation (QAM) such as, for example, QAM 1024 and QAM4096. These implementations are more susceptible to phase noise due to the greater number of constellation points, 1024 and 4096 respectively, that are more closely located in phase space and thus more difficult to discriminate.

An alternative to the use of CPE is to design tuners with reduced phase noise profiles, but this is difficult and costly, particularly when the tuners need to be integrated with digital or mixed-signal components.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for a receiver performing OFDM demodulation to cancel phase noise without introducing additional latency. This may be accomplished through the use of a predictive filter to estimate the phase of a current symbol, in a received signal, based on the phase of previous symbols received earlier in time. In some embodiments, phase noise distortion associated with multipath reflection may also be cancelled. In some embodiments, these techniques enable the relaxation of phase noise specifications on the receiver tuner and thereby reduce the overall complexity and cost of the system.

Some embodiments may be used in conjunction with one or more types of cable-based communication networks, systems and standards, for example, Multimedia over Coax (MoCA 2.0), Digital Video Broadcasting (DVB-C2), "Data Over Cable Service Interface Specification" (DOCSIS) or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE 802.11 (IEEE 802.11-2007:

Wireless LAN Medium Access Control (MAC) and Physical Layer (PHY) Specifications) standards and amendments ("the IEEE 802.11 standards"), IEEE 802.16 standards for Worldwide Interoperability for Microwave Access (WiMAX), Third Generation Partnership Project (3GPP) including Long Term Evolution (LTE) and Long Term Evolution Advanced (LTE-A) and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system or nodes on a cable network. Stations intended to be included within the scope of the present invention include, by way of example only, WLAN stations, wireless personal network (WPAN), and the like.

Figure 1:
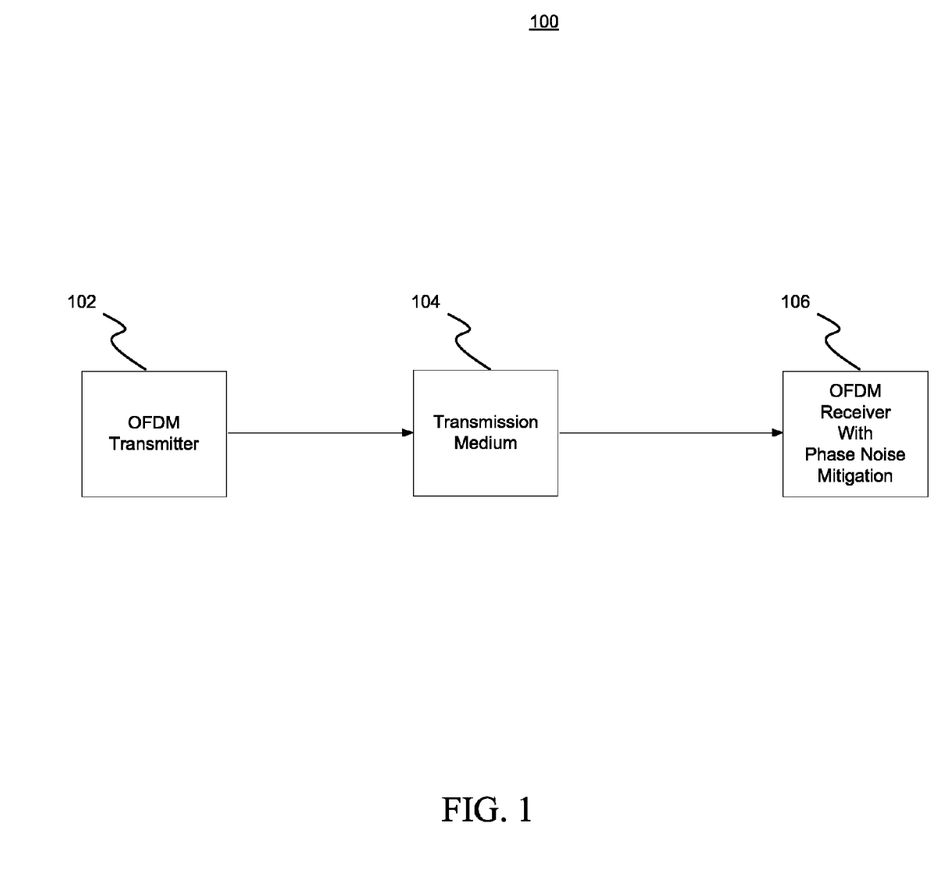
FIG. 1 illustrates a top level system diagram of one exemplary embodiment consistent with the present disclosure.

FIG. 1 illustrates a top-level system diagram 100 of one exemplary embodiment consistent with the present disclosure. A signal may be sent from an OFDM modulating transmitter 102 over a transmission medium 104, which may be a cable or wireless network for example, and received at receiver 106 where OFDM demodulation is performed according to an embodiment of the present disclosure which reduces phase noise without adding latency as will be described in greater detail below. Transmitter 102 and receiver 106 represent one pair of nodes in the network 104, but in practice receiver 106 may receive signals from a plurality of transmission nodes 102 over the network 104.

The signal may comprise a time ordered, or temporal, sequence of symbols. That is to say, at any given time there may be a current received symbol and a time ordered sequence of previously received symbols. The symbols, in turn, comprise a number of modulated sub-carriers. The sub-carriers are QAM modulated, having an in-phase or I (real) component and a quadrature or Q (imaginary) component that maps the sub-carrier for that symbol to a constellation point in phase space. The number of constellation point for each sub-carrier of each symbol may reach or exceed 4096 in order to achieve increased data rates. This comes at the expense, however, of imposing greater difficulty in estimating the constellation points in the presence of phase noise since the constellation points are more tightly clustered in the phase space.

Some of the sub-carriers are pilot sub-carriers while other sub-carriers are used for data transmission. The pilot sub-carriers, which are generally fewer in number than the data sub-carriers, are transmitted with a substantially smaller constellation size than might typically be used with the available signal to noise ratio (SNR). As a result, the pilot sub-carriers can be estimated with higher confidence. This is advantageous because the pilot sub-carriers are used for signal acquisition and to maintain timing and frequency synchronization. These pilot sub-carriers may also be used to estimate and reduce phase noise as will be described in greater detail below.

Figure 2:
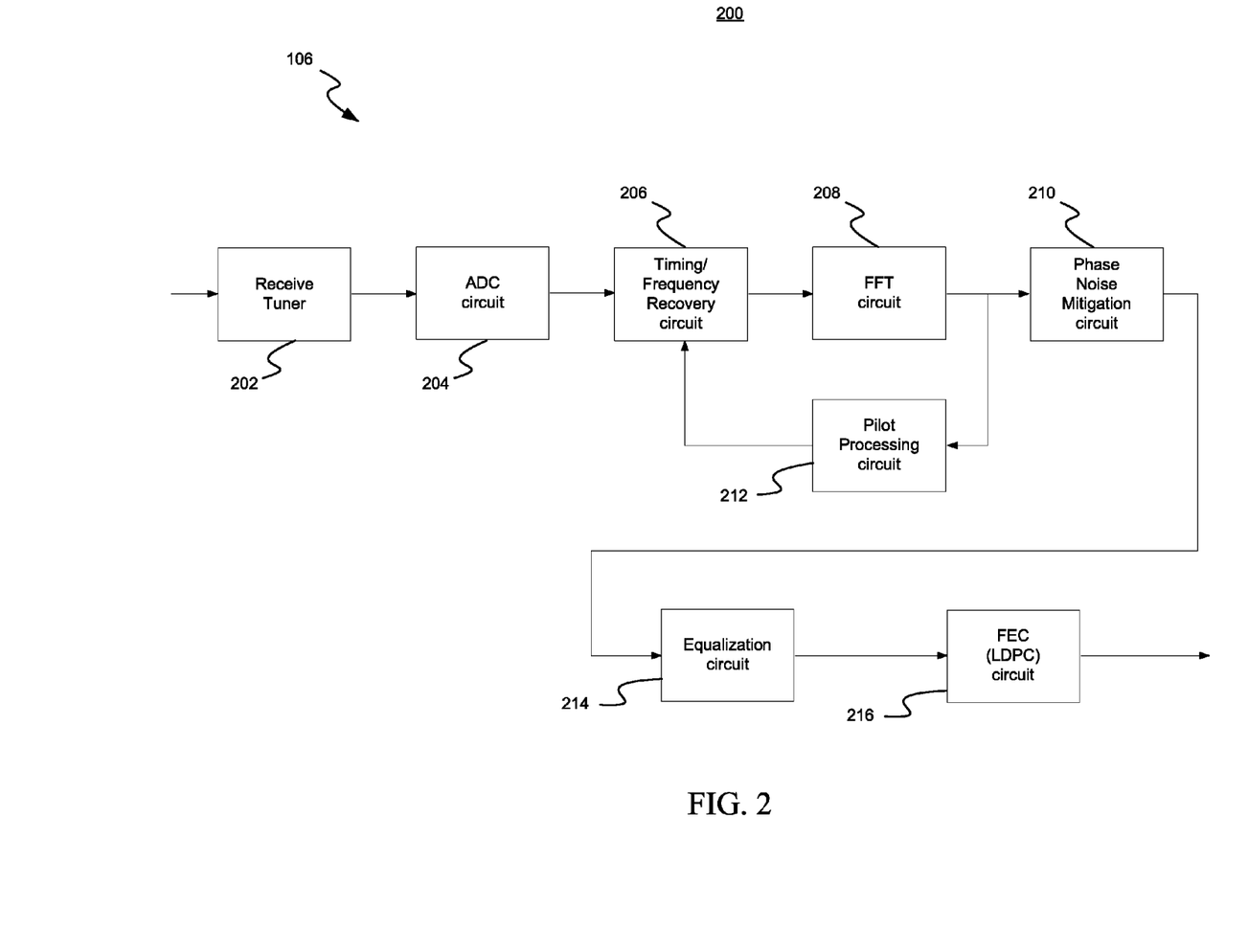
FIG. 2 illustrates a system diagram of one exemplary embodiment consistent with the present disclosure.

FIG. 2 illustrates a system diagram 200 of one exemplary embodiment consistent with the present disclosure. Components of OFDM receiver 106 are shown staring with a receive tuner 202 which is tuned to a center frequency of the received OFDM signal. Receive tuner 202 may down convert and low pass or band pass filter the OFDM signal to a base band frequency range. The output of receive tuner 202 is coupled to an analog to digital converter (ADC) circuit 204 which then provides the timing/frequency recovery circuit 206 with the digitally sample signal. Timing/frequency recovery circuit 206, along with FFT circuit 208 and pilot processing circuit 212 process the pilot sub-carriers from the signal and use them to obtain a synchronized version of the signal in the frequency domain which is supplied to the phase noise mitigation circuit 210, the operation of which will be described in greater detail below. The phase noise to be cancelled is introduced to the signal by the receive tuner 202 as well as the tuner (not shown) on the transmit side 102. After phase noise mitigation is accomplished, the signal is passed on to subsequent processing circuits including equalization 214 and forward error correction (FEC) such as, for example, low density parity check (LDPC) decoding.

Figure 3:
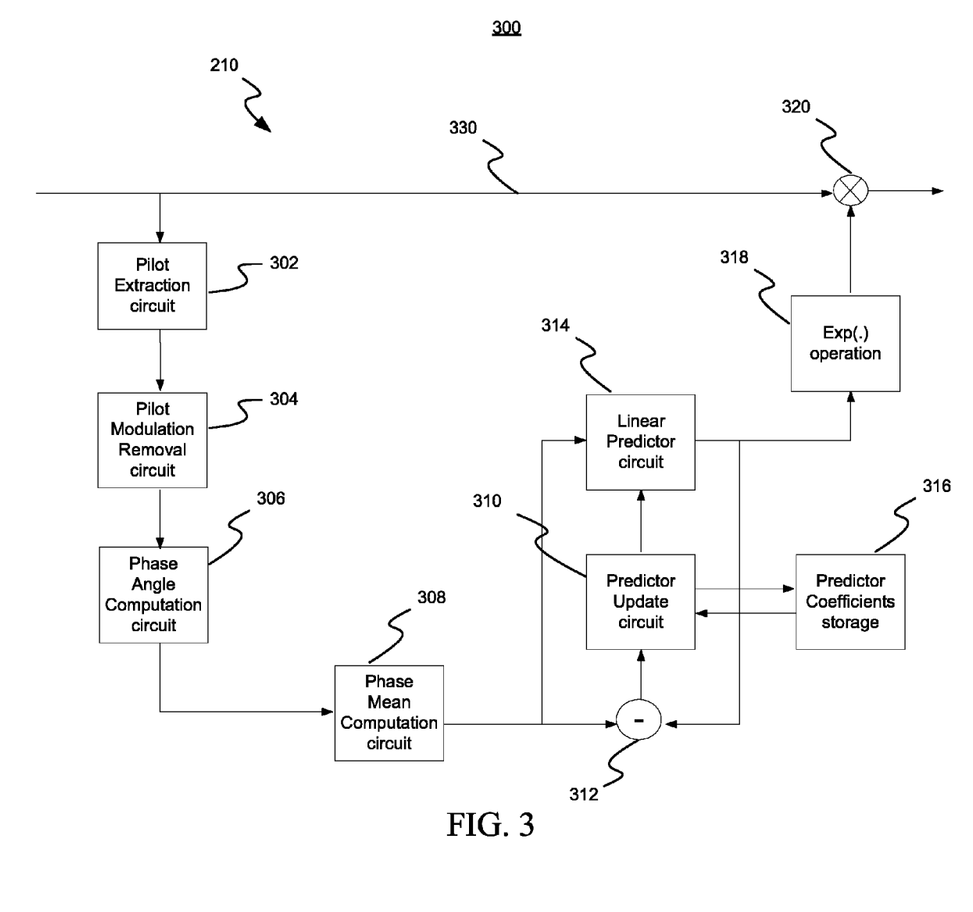
FIG. 3 illustrates a more detailed system diagram of one exemplary embodiment consistent with the present disclosure.

FIG. 3 illustrates a more detailed system diagram 300 of one exemplary embodiment consistent with the present disclosure. Components of the phase noise mitigation circuit 210 are illustrated. The received signal comprises a time ordered sequence of symbols $Z^k$ where k represents a time index of the symbol Z within the sequence. Pilot extraction circuit 302 extracts the pilot sub-carriers $Z_i^k$ of symbol k, for each of pilot sub-carriers i. Pilot modulation removal circuit 304 estimates the modulation $X_i^k$ for sub-carrier i of symbol k and removes the modulation by multiplying the carrier by the conjugate of the modulation. In some embodiments, $X_i^k$ may be predefined and hence estimation not required. In other embodiments, the pilot carriers may be transmitted with low order constellations enabling accurate estimation of $X_i^k$. Phase angle computation circuit 306 determines the phase angle of the resulting demodulated pilot sub-carrier symbol according to:

$$\phi_i^k = \arg(Z_i^{k*}(X_i^k)^*) \text{ for } i \in \{\text{pilot indices}\} \tag{1}$$

Here $(X_i^k)^*$ is the complex conjugate of $X_i^k$. Phase mean computation circuit 308 then calculates the mean of the phase angles of some or all of the pilot sub-carriers according to:

$$\phi_{mean}^k = \frac{1}{N_p} \sum_{i \in \{Pilot\}} \phi_i^k \tag{2}$$

where $N_p$ is the total number of pilots (or number of pilots to be used for the calculation) in symbol k. Since the pilots are transmitted with a reduced constellation size, as explained previously, the pilot modulations may be estimated with increased confidence resulting in an improved estimate of the phase mean $\overline{\phi_{mean}^k}$, for symbol k. This calculated phase mean could be used to correct the phase noise for all sub-carriers of symbol k, a technique called common phase error correction (CPE), however it is not possible to implement CPE correction until the complete symbol has been received because equation (1) has to be implemented before equation (2), which would result in processing latency that cannot be tolerated in many bi-directional communication applications.

Instead, it is possible to take advantage of the fact that the power spectral density of phase noise is concentrated largely in the low frequency end, compared to the bandwidth of cable applications which may exceed 100 MHz, and therefore the autocorrelation of phase noise from symbol to symbol is high enough that prediction of mean phase for a current symbol is possible based on the measured or computed phase of preceding symbols, thus avoiding the latency problem.

A predictive filter, such as a Weiner filter, may be constructed and implemented in linear predictor circuit 314 to predict the least mean squared value of the phase of symbol k from the L preceding symbols as in equation (3):

$$\overline{\phi_{mean}^k} = \sum_{n=1}^{L} h^{(n)} \phi_{mean}^{(k-n)} \tag{3}$$

Here, $\phi_{mean}^{(k-n)}$ may be computed according to equation (2) for the previous symbols and predictive filter coefficients $h^{(n)}$ may be computed using an adaptive filter which is updated using a normalized least mean square algorithm. The filter coefficients may be initialized to $\{1, 0, 0, 0, \ldots\}$ for n=1, 2, ..., L, and then updated according to:

$$h^{(n)} \leftarrow h^{(n)} + \frac{\mu}{\sum_{n=1}^{L} \left(\phi_{mean}^{(k-n)}\right)^2} \phi_{mean}^{k-n} \left(\phi_{mean}^k - \overline{\phi_{mean}^k}\right), \tag{4}$$

for $n = 1, 2, \ldots, L$

Predictor update circuit 310 (in conjunction with differencer 312) perform this operation. The adaptation speed may be adjusted based on the µ parameter, which is typically initialized to a value greater than 0 but less than 1. In some embodiments, µ may be set initially to a relatively large value, in the above range, for fast adaptation and then reduced over time as the mean square phase error is reduced. The number of previous symbols L may be selected based on received signal bandwidth, OFDM FFT size and power spectral density of the phase noise profile. In some embodiments, a value of L=10 may provide a 5 dB improvement in SNR.

The predicted value of phase, $\overline{\phi_{mean}^k}$, may then be used for phase error correction on some or all of sub-carriers i of symbol k according to:

$$Z_i^k \leftarrow Z_i^k \exp(-j\overline{\phi_{mean}^k}) \tag{5}$$

This is accomplished in modules 318 and 320. Since $\overline{\phi_{mean}^k}$ is computed before the arrival of symbol k, equation (5) for phase noise correction is implemented without any penalty for latency (or storage requirement). In other words, there is no delay element, i.e., latency, in the main signal path 330.

Since a communication network 104 may comprise multiple communication nodes, in some embodiments receiver 106 may be coupled to a plurality of transmitters 102. The transmit-receive tuner combination of each pairing may have a different phase noise profile. Each receiver may therefore store a coefficient set h(n) associated with every coupled transmitter in coefficient storage module 316. Each coefficient set h(n) may then be updated while the receiver is communicating with the associated transmitting node.

Figure 4:
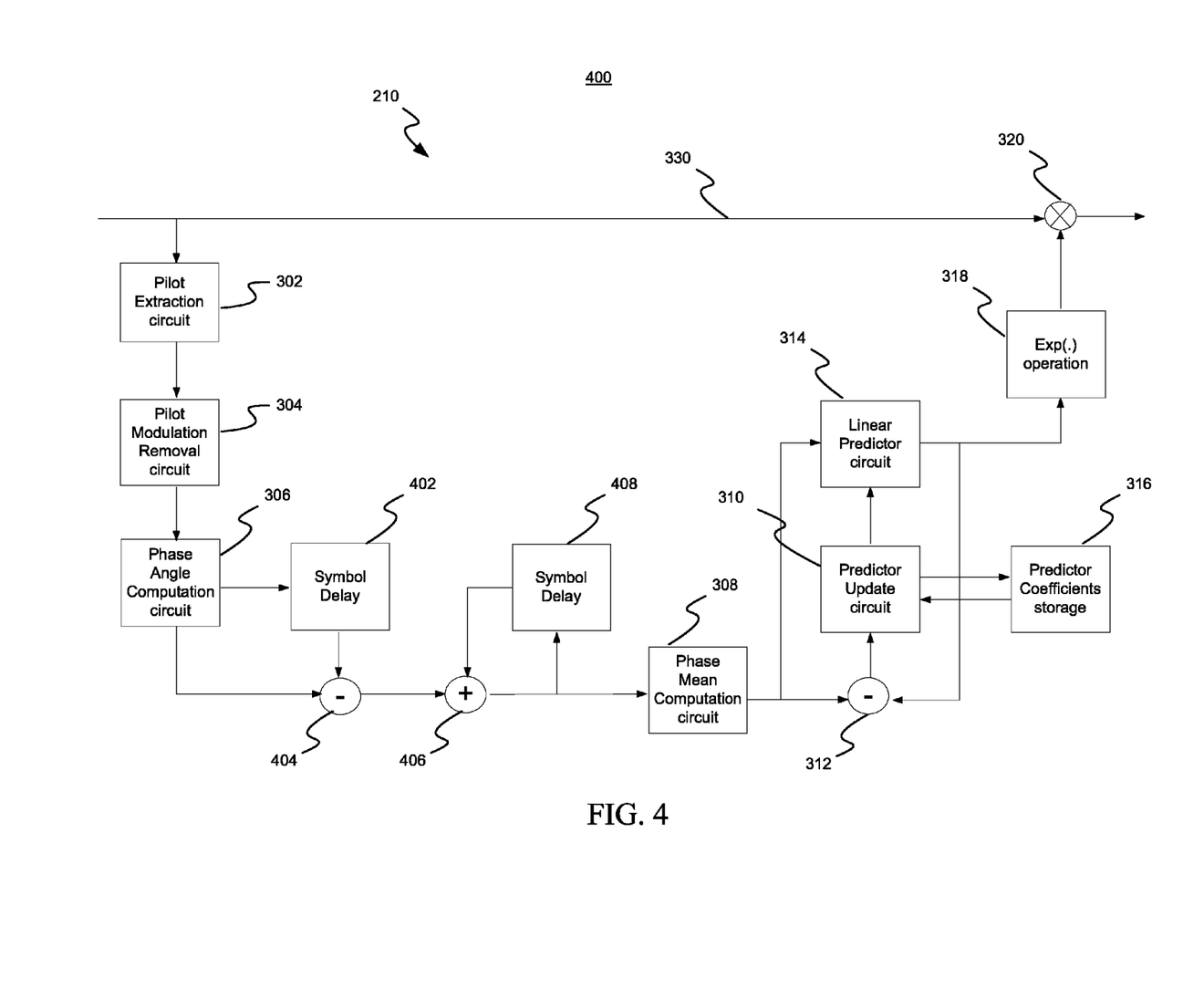
FIG. 4 illustrates a more detailed system diagram of another exemplary embodiment consistent with the present disclosure.

FIG. 4 illustrates a more detailed system diagram 400 of another exemplary embodiment consistent with the present disclosure. Components of the phase noise mitigation circuit 210, configured to operate on signals having multi-path induced phase distortion, are illustrated. Pilot extraction circuit 302, pilot modulation removal circuit 304 and phase angle computation circuit 306 operate as described above with respect to FIG. 3.

Transmission channels, for example in a cable or wireless network, typically introduce reflections or echo which may cause multi-path phase distortion. This type of distortion will remain present in the phase calculation performed by phase angle computation circuit 306 in accordance with equation (1):

$$\phi_i^k = \arg(Z_i^{k*}(X_i^k)^*) \text{ for } i \in \{\text{pilot indices}\} \tag{1}$$

despite the fact that the pilot sub-carriers are transmitted with reduced constellation size. It may be assumed, however, that the reflections do not change from one symbol to the next since reflections are typically caused by physical or electrical characteristics of the transmission medium that do not change over a time period on the order of a few milliseconds. The system may therefore be modified to compute the differential of the phase angles between successive symbols $Z^k$ for each pilot sub-carrier i:

$$\Delta\phi_i^k = \arg(Z_i^{k*}(X_i^k)^*) - \arg(Z_i^{k-1*}(X_i^{k-1})^*) \text{ for } i \in \{\text{pilot indices}\} \tag{6}$$

This operation is carried out by differencer circuit 404 and symbol delay 402. Since the cable reflections do not change appreciably from one symbol to another, the difference tends to cancel out the phase distortion introduced by the reflections because both terms in the right hand side of the equation have the same phase distortion. That is, $\Delta\phi_i^k$ is independent of the reflections in the communication channel. This operation can also be described as a high pass filter, which filters out the more slowly varying (lower frequency) multi-path phase distortion.

In order to recover $\phi_i^k$ excluding the channel component of the phase angle, the $\Delta\phi_i^k$ may be integrated over time:

$$\psi_i^k = \psi_i^{k-1} + \Delta\phi_i^k \text{ for } i \in \{\text{pilot indices}\} \tag{7}$$

This operation is carried out by summer circuit 406 and symbol delay 408. The mean of the phase angles may then be calculated using the integrated value $\psi_i^k$:

$$\phi_{mean}^k = \frac{1}{N_p} \sum_{i \in \{Pilot\}} \psi_i^k \tag{8}$$

This operation is carried out by phase mean computation circuit 308. The remaining portions of the system operate in the same manner as described above with respect to FIG. 3.

Figure 5:
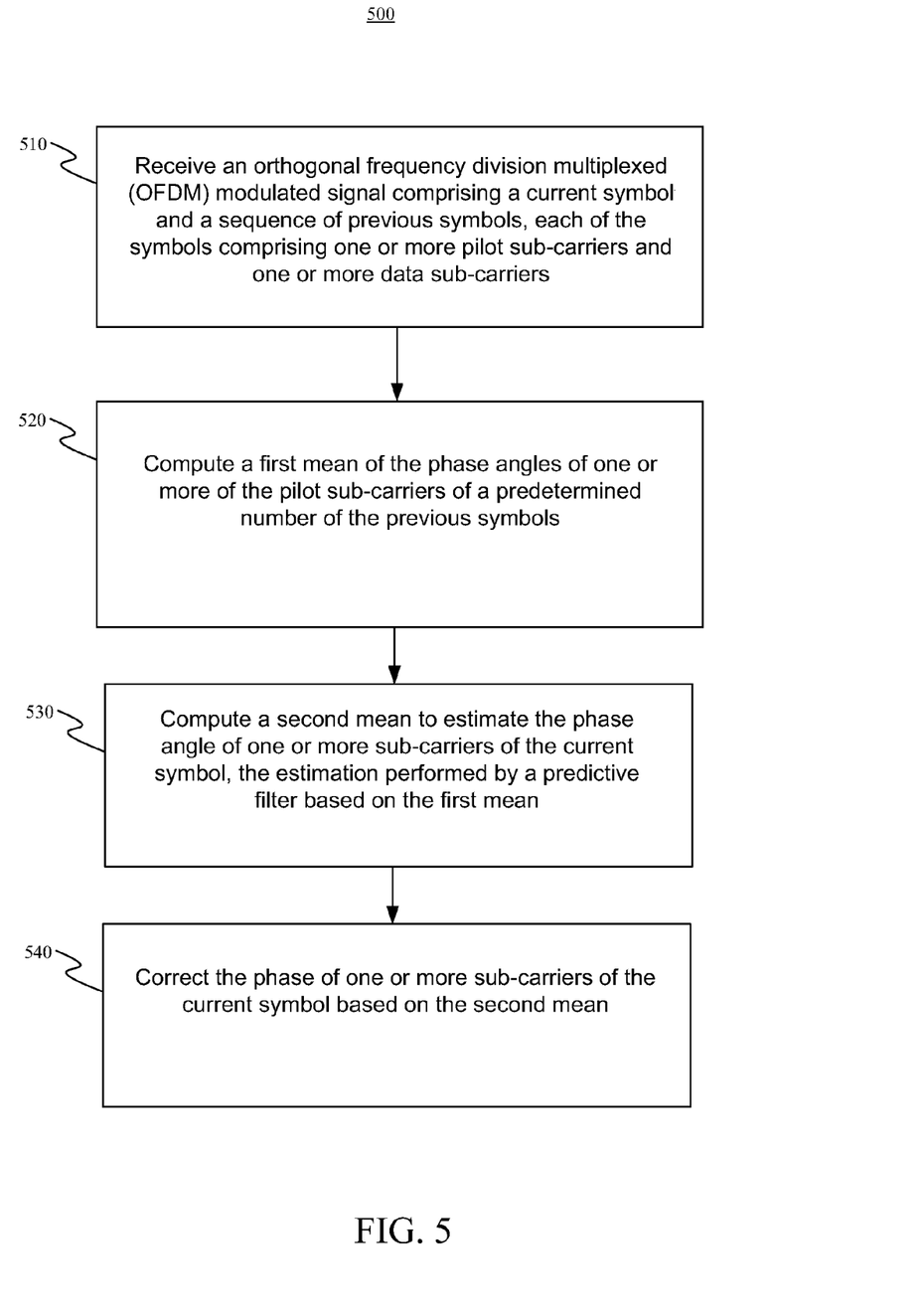
FIG. 5 illustrates a flowchart of operations of one exemplary embodiment consistent with the present disclosure.

FIG. 5 illustrates a flowchart of operations 500 of one exemplary embodiment consistent with the present disclosure. At operation 510, an OFDM modulated signal comprising a current symbol and a sequence of previous symbols is received. Each of the symbols further include one or more pilot sub-carriers and one or more data sub-carriers. At operation 520, a first mean of the phase angles of one or more of the pilot sub-carriers of a predetermined number of the previous symbols is computed. At operation 530, a second mean is computed to estimate the phase angle of one or more sub-carriers of the current symbol. The estimation is performed by a predictive filter based on the first mean. At operation 540, the phase of one or more sub-carriers of the current symbol is corrected based on the second mean.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for cancelling phase noise in an orthogonal frequency division multiplexed (OFDM) modulated received signal, said system comprising:
   a demodulator configured to receive an OFDM modulated signal comprising a current symbol and a sequence of previous symbols, each of said symbols comprising one or more pilot sub-carriers and one or more data sub-carriers;
   a phase angle computation circuit coupled to said demodulator, said phase angle computation circuit configured to compute a first mean, said first mean computed from the phase angle of one or more of said pilot sub-carriers of a predetermined number of said previous symbols;
   a predictive filter circuit coupled to said phase angle computation circuit, said predictive filter circuit configured to compute a second mean, said second mean estimating the phase angle of one or more sub-carriers of said current symbol, said estimation based on said first mean; and
   a phase noise cancelling circuit coupled to said predictive filter circuit, said phase noise cancelling circuit configured to correct the phase of one or more sub-carriers of said current symbol based on said second mean.

2. The system of claim 1, wherein said predictive filter circuit implements a Weiner filter configured to minimize a mean squared error of said second mean.

3. The system of claim 2, further comprising a normalized least mean square adaptive filter configured to compute a set of filter coefficients for said Weiner filter.

4. The system of claim 1, further comprising a Fast Fourier Transform (FFT) circuit configured to transform said OFDM modulated signal to the frequency domain.

5. The system of claim 4, wherein said predetermined number of said previous symbols is selected based on at least one of: the bandwidth of said OFDM modulated signal, the resolution of said FFT, and the power spectral density of the phase noise of said OFDM modulated signal.

6. The system of claim 3, wherein said OFDM modulated signal is received from a plurality of transmission nodes in a communication network and a plurality of said sets of filter coefficients is computed, each of said sets of filter coefficients associated with one of said plurality of transmission nodes.

7. The system of claim 6, wherein said phase angle computation circuit further comprises a high-pass filter configured to reduce phase noise associated with multipath reflections in said communication network.

8. The system of claim 1 further comprising a platform including a processor coupled to said demodulator, memory coupled to said processor and a user interface coupled to said processor.

9. The system of claim 8 wherein said platform is one of a smartphone, a tablet or a laptop computing device.

10. The system of claim 8 wherein said user interface is a touchscreen.

11. The system of claim 8 further comprising a plurality of said platforms each configured to communicate over said communication network.

12. The system of claim 11 wherein said communication network is a Wireless Wide Area Network (WWAN).

13. The system of claim 11 wherein said communication network is a Wireless Metropolitan Area Network (WMAN).

14. The system of claim 11 wherein said communication network is a cable network.

15. A system for cancelling phase noise in a communication network, said system comprising:
   a platform including a processor, memory coupled to said processor and a user interface coupled to said processor;
   a first receiver coupled to said processor, said first receiver configured to receive OFDM modulated signals from said communication network through a wireless medium, said OFDM modulated signals comprising a current symbol and a sequence of previous symbols, each of said symbols comprising one or more pilot sub-carriers and one or more data sub-carriers;
   a second receiver coupled to said processor, said second receiver configured to receive said OFDM modulated signals from said communication network through a cable medium;

a phase angle computation circuit coupled to said first and second receivers, said phase angle computation circuit configured to compute a first mean, said first mean computed from the phase angle of one or more of said pilot sub-carriers of a predetermined number of said previous symbols;

a predictive filter circuit coupled to said phase angle computation circuit, said predictive filter circuit configured to compute a second mean, said second mean estimating the phase angle of one or more sub-carriers of said current symbol, said estimation based on said first mean; and a phase noise cancelling circuit coupled to said predictive filter circuit, said phase noise cancelling circuit configured to correct the phase of one or more sub-carriers of said current symbol based on said second mean.

16. The system of claim 15, wherein said predictive filter circuit implements a Weiner filter configured to minimize a mean squared error of said second mean.

17. The system of claim 16, further comprising a normalized least mean square adaptive filter configured to compute a set of filter coefficients for said Weiner filter.

18. The system of claim 15, further comprising a Fast Fourier Transform (FFT) circuit configured to transform said OFDM modulated signal to the frequency domain.

19. The system of claim 18, wherein said predetermined number of said previous symbols is selected based on at least one of: the bandwidth of said OFDM modulated signal, the resolution of said FFT, and the power spectral density of the phase noise of said OFDM modulated signal.

20. The system of claim 17, wherein said OFDM modulated signal is received from a plurality of transmission nodes in a communication network and a plurality of said sets of filter coefficients is computed, each of said sets of filter coefficients associated with one of said plurality of transmission nodes.

21. The system of claim 20, wherein said phase angle computation circuit further comprises a high-pass filter configured to reduce phase noise associated with multipath reflections in said communication network.

22. The system of claim 15 wherein said platform is one of a smartphone, a tablet or a laptop computing device.

23. The system of claim 15 wherein said user interface is a touchscreen.

24. A method for cancelling phase noise in an OFDM modulated received signal, said method comprising:
receiving an OFDM modulated signal comprising a current symbol and a sequence of previous symbols, each of said symbols comprising one or more pilot sub-carriers and one or more data sub-carriers;
computing a first mean of the phase angles of one or more of said pilot sub-carriers of a predetermined number of said previous symbols;
computing a second mean to estimate the phase angle of one or more sub-carriers of said current symbol, said estimation performed by a predictive filter based on said first mean; and
correcting the phase of one or more sub-carriers of said current symbol based on said second mean.

25. The method of claim 24, wherein said predictive filter circuit implements a Weiner filter configured to minimize a mean squared error of said second mean.

26. The method of claim 25, further comprising computing a set of filter coefficients for said Weiner filter using a normalized least mean square adaptive filter.

27. The method of claim 24, further comprising transforming said OFDM modulated signal to the frequency domain using an FFT.

28. The method of claim 27, further comprising selecting said predetermined number of said previous symbols based on at least one of: the bandwidth of said OFDM modulated signal, the resolution of said FFT, and the power spectral density of the phase noise of said OFDM modulated signal.

29. The method of claim 26, further comprising receiving said OFDM modulated signal from a plurality of transmission nodes in a cable network and computing a plurality of said sets of filter coefficients, each of said sets of filter coefficients associated with one of said plurality of transmission nodes.

30. The method of claim 29, further comprising performing a high-pass filter on the phase angles of one or more of said pilot sub-carriers to reduce phase noise associated with multipath reflections in said cable network.

31. A non-transitory computer-readable storage medium having instructions stored thereon which when executed by a processor result in the following operations for cancelling phase noise in an OFDM modulated received signal, said operations comprising:
receiving an OFDM modulated signal comprising a current symbol and a sequence of previous symbols, each of said symbols comprising one or more pilot sub-carriers and one or more data sub-carriers;
computing a first mean of the phase angles of one or more of said pilot sub-carriers of a predetermined number of said previous symbols;
computing a second mean to estimate the phase angle of one or more sub-carriers of said current symbol, said estimation performed by a predictive filter based on said first mean; and
correcting the phase of one or more sub-carriers of said current symbol based on said second mean.

32. The non-transitory computer-readable storage medium of claim 31, wherein said operations further comprise said predictive filter circuit implementing a Weiner filter configured to minimize a mean squared error of said second mean.

33. The non-transitory computer-readable storage medium of claim 32, wherein said operations further comprise computing a set of filter coefficients for said Weiner filter using a normalized least mean square adaptive filter.

34. The non-transitory computer-readable storage medium of claim 31, wherein said operations further comprise transforming said OFDM modulated signal to the frequency domain using an FFT.

35. The non-transitory computer-readable storage medium of claim 34, wherein said operations further comprise selecting said predetermined number of said previous symbols based on at least one of: the bandwidth of said OFDM modulated signal, the resolution of said FFT, and the power spectral density of the phase noise of said OFDM modulated signal.

36. The non-transitory computer-readable storage medium of claim 33, wherein said operations further comprise receiving said OFDM modulated signal from a plurality of transmission nodes in a cable network and computing a plurality of said sets of filter coefficients, each of said sets of filter coefficients associated with one of said plurality of transmission nodes.

37. The non-transitory computer-readable storage medium of claim 36, wherein said operations further comprise performing a high-pass filter on the phase angles of one or more of said pilot sub-carriers to reduce phase noise associated with multipath reflections in said cable network.

* * * * *